United States Patent
Van Dyke et al.

(10) Patent No.: US 7,340,523 B2
(45) Date of Patent: Mar. 4, 2008

(54) HIGH PERFORMANCE CALL DISTRIBUTION SYSTEM USING A DISPATCHER AND MULTIPLE PROCESSORS FOR PROCESSING SESSION INITIATION DIALOGS

(75) Inventors: John J. Van Dyke, Concord, MA (US); Christopher J. Burke, Boxford, MA (US)

(73) Assignee: Dialogic Corporation, Montreal (CA)

( * ) Notice: Subject to any disclaimer, the term of this patent is extended or adjusted under 35 U.S.C. 154(b) by 966 days.

(21) Appl. No.: 10/748,373

(22) Filed: Dec. 30, 2003

(65) Prior Publication Data

US 2004/0153497 A1 Aug. 5, 2004

Related U.S. Application Data

(60) Provisional application No. 60/437,937, filed on Jan. 3, 2003.

(51) Int. Cl.
*G06F 15/16* (2006.01)
(52) U.S. Cl. .............. 709/227; 709/228; 709/229
(58) Field of Classification Search ............... 709/227, 709/228, 229, 223; 455/518; 379/373.01; 370/338, 352, 466, 260
See application file for complete search history.

(56) References Cited

U.S. PATENT DOCUMENTS

| | | | |
|---|---|---|---|
| 2002/0094831 A1* | 7/2002 | Maggenti et al. | 455/518 |
| 2002/0188744 A1 | 12/2002 | Mani | 709/231 |
| 2003/0012149 A1* | 1/2003 | Maggenti et al. | 370/260 |
| 2003/0137991 A1* | 7/2003 | Doshi et al. | 370/466 |
| 2003/0200298 A1* | 10/2003 | Su et al. | 709/223 |
| 2003/0210694 A1 | 11/2003 | Jayaraman et al. | 370/392 |
| 2003/0235184 A1* | 12/2003 | Dorenbosch et al. | 370/352 |
| 2004/0032843 A1* | 2/2004 | Schaefer et al. | 370/338 |
| 2004/0093433 A1* | 5/2004 | Armbruster et al. | 709/247 |
| 2004/0120505 A1* | 6/2004 | Kotzin et al. | 379/373.01 |
| 2004/0133683 A1* | 7/2004 | Keller et al. | 709/227 |

OTHER PUBLICATIONS

Rosenberg, J. et al., "SIP: Session Initiation Protocol," Request For Comments: 3261, Jun. 2002, Network Working Group, EIF, pp. 1-20 and 77-122.

* cited by examiner

*Primary Examiner*—Le Hien Luu
(74) *Attorney, Agent, or Firm*—Weingarten, Schurgin, Gagnebin & Lebovici LLP

(57) ABSTRACT

A media server system includes a dispatcher and a set of processors either in the same physical system or in separate physical systems. The dispatcher receives the initial messages of respective session initiation dialogs from sources such as application servers. For each message, the dispatcher selects one of the processors to conduct the session initiation dialog and forwards the message to the selected processor using a port number uniquely associated with the processor and a switch fabric that routes the message to the processor associated with the modified port number. Upon receiving an initial session dialog message from the dispatcher, each processor creates a response message including the processor's port identifier, and sends the response message to the application server that was the source of the initial message. Subsequent messages of the session initiation dialog are sent directly to the selected processor by the application server, bypassing the dispatcher.

16 Claims, 2 Drawing Sheets

HIGH PERFORMANCE CALL DISTRIBUTION SYSTEM USING A DISPATCHER AND MULTIPLE PROCESSORS FOR PROCESSING SESSION INITIATION DIALOGS

CROSS REFERENCE TO RELATED APPLICATIONS

This application claims priority under 35 U.S.C. §119(e) of U.S. Provisional Patent Application No. 60/437,937 filed Jan. 3, 2003.

STATEMENT REGARDING FEDERALLY SPONSORED RESEARCH OR DEVELOPMENT

Not Applicable

BACKGROUND OF THE INVENTION

The invention pertains to the field of initiating calls or sessions in communications networks.

In systems providing communications services, it is known to distribute requests for services among a plurality of service providing entities, such as servers or individual processors within a server. The individual servers or processors perform the bulk of the processing and data transfer associated with the sessions, and the overall system is designed to achieve a desired balance of cost and performance for a desired capacity. However, one performance bottleneck that has remained in such systems is the entity responsible for assigning the service requests among the servers or processors. In some cases, the volume of signaling traffic or "session dialogs" associated with a large number of service requests can slow down the performance of a system even when there are sufficient processing resources for handling the intra-session activities of all requested sessions.

To address the performance issues associated with handling session dialogs, it has been known to utilize so-called "proxy servers" in systems having a distributed service architecture. For example, in systems utilizing the Session Initiation Protocol (SIP), a SIP proxy server contains information identifying alternative servers that are available to handle service requests. For each request, the proxy server selects a server to handle the request, re-formats the request message from the requester, and sends the re-formatted request to the selected server. All subsequent traffic between the requester and selected server flows through the proxy server. Although this arrangement has the benefit that all requesters see only a single point of service, the proxy server(s) can easily become bottlenecks that reduce performance. Additionally, the proxy server(s) add to overall system cost.

Another mechanism employed in certain systems, including SIP-based systems, is the use of a "redirect" message. Using such a message, the recipient of a session initiation message explicitly signals a session initiator to redirect its session initiation request to another server. While such redirection has the benefit that the initial recipient retains no state information about the request nor is involved in subsequent session data transfers, it unfortunately causes a significant increase (substantially double) in session signaling traffic. This increase in signaling traffic can lead to undesirable communications and processing bottlenecks.

It would be desirable to provide for the distribution of session initiation requests among a plurality of servers and/or processors in a manner that is transparent to session initiators and that provides for high throughput of signaling traffic in a scalable fashion.

BRIEF SUMMARY OF THE INVENTION

In accordance with the present invention, a media server system is disclosed in which calls or session requests are assigned to processors in a manner that is substantially transparent to the requestor and that provides for high-throughput processing of session initiation dialogs.

The media server system includes a dispatcher and a collection of processors, which may reside in the same physical system as the dispatcher or in a separate physical system. The sources of session initiation dialog send initial session requests using a well-known port identifier associated with the dispatcher. In one embodiment, the sources of session initiation dialogs include application servers that provide high-level communications services such as conferencing. Upon receiving each initial message, the dispatcher selects one of the processors to conduct the session initiation dialog and forwards the initial message to the selected processor. The forwarding of the initial message may be accomplished by modifying the port number of the message to a port number uniquely associated with the selected processor, and then sending the message into a switch fabric or other interconnection that routes the message to the processor associated with the modified port number.

Upon receiving an initial message of a session initiation dialog from the dispatcher, each processor creates a response message including the port identifier uniquely associated with the processor to identify the port to which subsequent messages of the session initiation dialog are to be directed. The response message is then sent to the application server that was the source of the initial message. Subsequent messages of the session initiation dialog can be sent directly to the selected processor by the application server, bypassing the dispatcher. Thus, the bulk of session initiation dialog is handled in a distributed fashion by the same processors that control the media services associated with session, substantially enhancing performance while maintaining the desired degree of transparency obtained using a centralized dispatcher.

Other aspects, features, and advantages of the present invention will be apparent from the Detailed Description that follows.

DETAILED DESCRIPTION OF THE INVENTION

The disclosure of U.S. Provisional Patent Application No. 60/437,937 filed Jan. 3, 2003 is hereby incorporated by reference.

Figure 1:
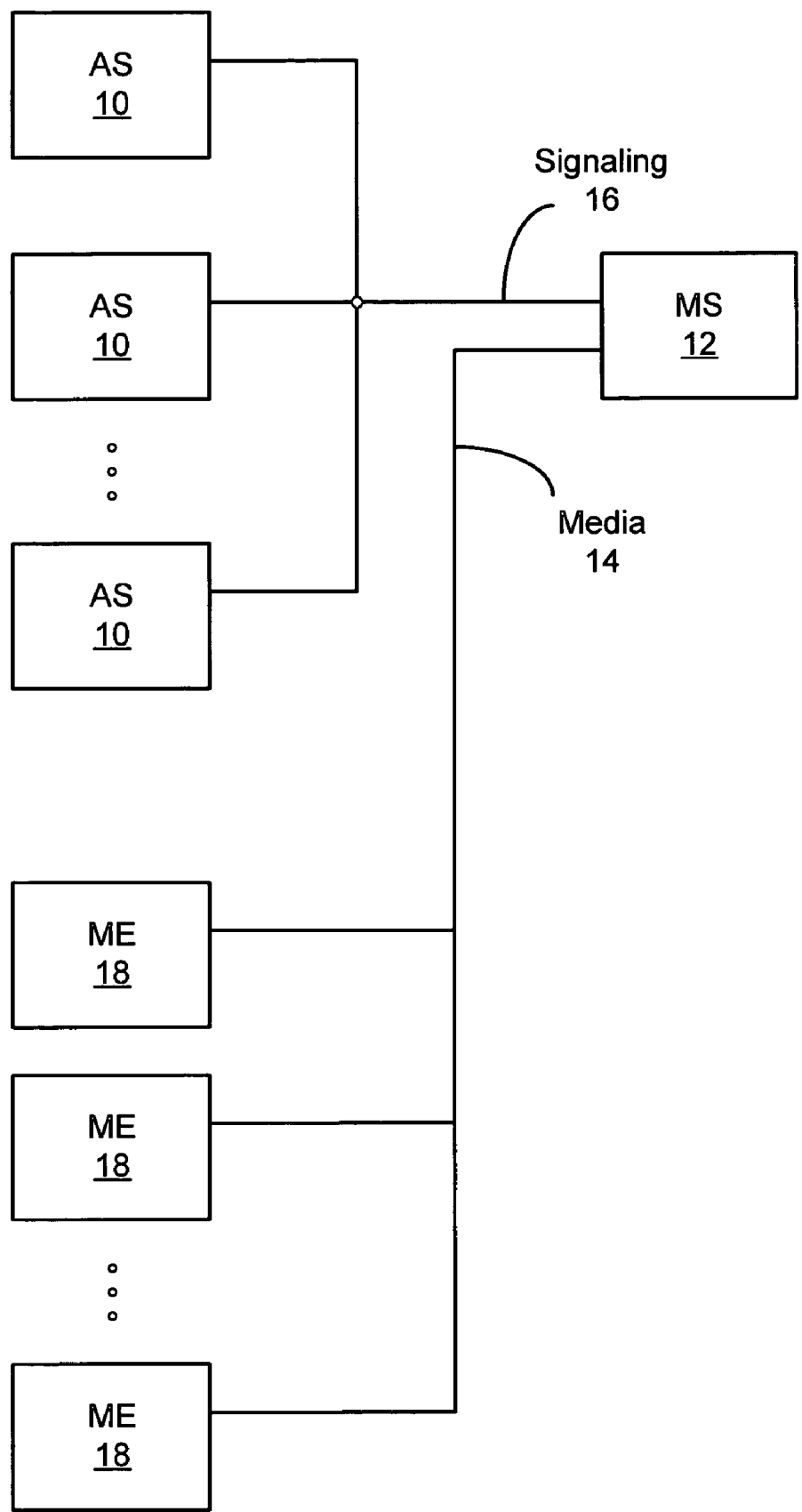
FIG. 1 is a block diagram of a communications network with a media server in accordance with the present invention.

In FIG. 1, a communications system includes a plurality of application servers (AS) 10 and a media server (MS) 12 that provide communications services such as conferencing and interactive voice response (IVR) functions, among other services. These services are provided to a plurality of media endpoints (ME) 18 which may include media gateways, voice over IP (VOIP) phones, personal computers or similar devices. Media streams of communications sessions are carried on media connections 14, which are created, modified, and terminated via signaling transactions on separate signaling channels 16. The signaling transactions are in accordance with a session management protocol such as Session Initiation Protocol (SIP) or Media Gateway Control Protocol (MGCP). The signaling transactions are delivered over the network via transport protocols such as User Datagram Protocol (UDP). The media streams are delivered in accordance with a media transport protocol such as the Real Time Protocol (RTP).

For economic reasons, it is desirable that the MS 12 be capable of providing media services for a large number of concurrent sessions with minimal service latency, i.e., minimal delay between the receipt of a request for service and the delivery of a media stream. For handling a large number of concurrent media streams, it has been known to provide multiple independent processors within a media server and some means for assigning media streams to the different processors. As the media-processing capacity of the MS 12 increases, however, there is a commensurate increase in the amount of associated signaling traffic for managing the media connections 14. A high volume of signaling traffic can cause increased service latency and/or undue limitations on the number of concurrent media streams that are allowed.

Figure 2:
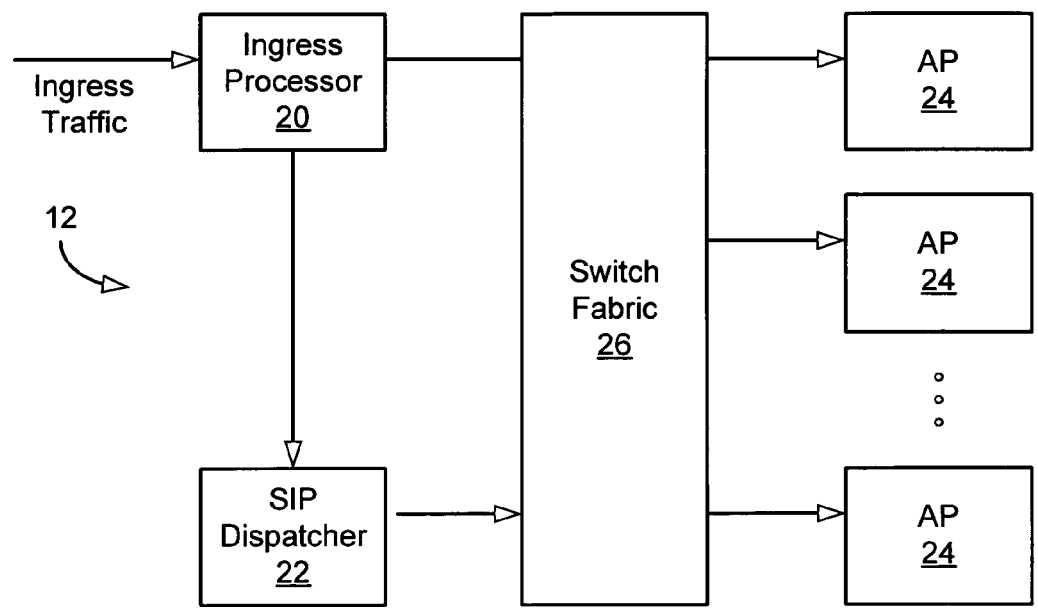
FIG. 2 is a block diagram of a media server in the system of FIG. 1.

FIG. 2 shows an arrangement for a MS 12 that provides for high performance handling of a relatively large volume of signaling traffic so as to minimize the impact of the signaling traffic on MS performance. Incoming SIP signaling messages, shown as "ingress traffic" in FIG. 2, are received by an ingress processing function 20. As described in more detail below, the signaling messages are either forwarded to a SIP dispatcher 22 or to one of several application processors (AP) 24 via a switch fabric 26. The SIP dispatcher 22 is also capable of forwarding messages to the APs 24 via the switch fabric 26.

The general problem addressed by the presently disclosed technique is to utilize the plurality of APs 24 to achieve high overall performance of the MS 12. As already mentioned, it has been known to assign different SIP sessions to different APs 24 so as to enable the MS 12 to carry a large number of concurrently active media sessions. It would be possible to assign unique SIP addresses (IP addresses) to the various APs 24 such that each AP 24 can be directly accessed from an external device such as an AS 10 (FIG. 1). However, such an arrangement would be undesirable from a system perspective. In such a case, it would potentially be necessary to configure each AS 10 with all of the unique SIP addresses of the various APs 24 as well as information describing the kinds of traffic to be directed to each one. In large scale systems, the number of IP addresses required to support such an arrangement becomes prohibitive. Furthermore, whenever the MS 12 were to be upgraded or re-configured in a manner affecting the number or capabilities of the APs 24 or their respective SIP addresses, it would be necessary to also re-configure each AS 10 so as to maintain a coherent view of the MS 12 throughout the system. Such complexities at the system level are preferably avoided.

Therefore, the MS 12 is assigned one SIP address that becomes well-known to all the ASs 10 through configuration information. Additionally, the MS 12 utilizes a well-known port identifier, such as port number 5060, to which initial SIP requests are to be directed. The various APs 24 are each assigned a unique port identifier different from the well-known port identifier. The port identifier of an AP 24 assigned to a session is sent to a requesting AS 10 during the initial part of the session signaling, in the manner described below. It may be convenient to assign port identifiers to APs 24 in some predetermined order such as 5061, 5062, . . . , or to utilize another suitable port identifier assignment scheme.

Figure 3:
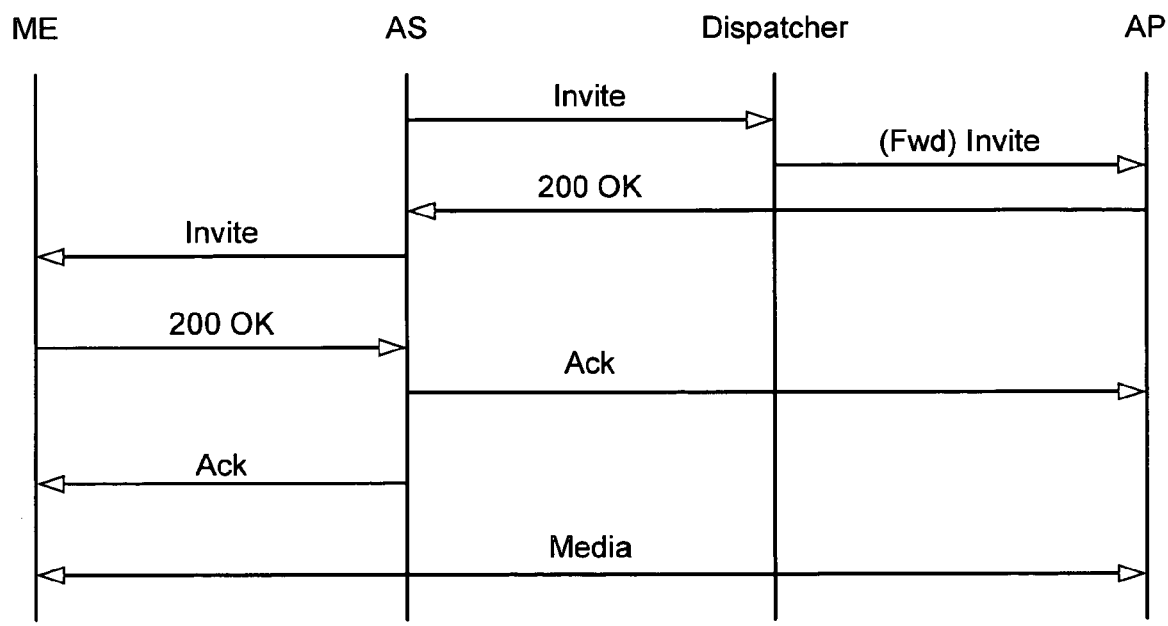
FIG. 3 is a signaling diagram illustrating certain signaling operations of the system of FIG. 1, including internal signaling in the media server of FIG. 2.

The operation of the system of FIGS. 1 and 2 is illustrated with respect to an initial portion of a SIP session as shown in FIG. 3. An AS 10 desiring to initiate a media session between an ME 18 and the MS 12 creates a SIP INVITE message and sends it to the well-known SIP address and port number of the MS 12. If the well-known address is 10.1.1.1 and the well-known port number is 5060, for example, then the Request line of the INVITE message will look as follows:

INVITE sip:svc@10.1.1.1:5060 SIP/2.0 where "10.1.1.1:5060" is the Request Uniform Resource Indicator (URI) identifying the MS 12 as the target of the INVITE message, and where "svc" represents the name of a SIP service type offered by the MS 12. Such service types include announcements, conferencing, interactive voice response (IVR), and dialogs. As is known in the art, the Request line is followed by various header lines and the body of the SIP message.

The INVITE message is received by the ingress processing function 20 of the MS 12 (FIG. 2), which uses classification/filter processing to identify the message as a SIP INVITE. Once so identified, the message is removed from the normal ingress flow and forwarded to the SIP dispatcher 22 to be assigned to an AP 24.

When the SIP dispatcher 22 receives the INVITE message, it selects an AP 24 to handle the SIP session. This selection may be made in a variety of ways. It may be desirable that different APs 24 are optimized for different types of services, in which case part of the selection process is to determine the service type being requested and the identity of one or more APs 24 that are designated for the requested service type. Generally, there will be multiple APs 24 available for a given service type, so that it will be necessary to perform further selection from among the available APs. This selection can be performed based on certain information in the SIP INVITE message. For example, a hash function can be applied to the Call Identifier or Conference Identifier appearing in the INVITE message, and the output of the hash function is used to identify an AP 24. Other information from the SIP message may also be used, such as the "To" and "From" fields. The SIP message information that is used to select an AP should be globally unique, so that messages belonging to the same session are assigned to the same AP 24. This ensures that in the case of re-transmissions, only one AP 24 receives all the traffic for a given session.

To optimize the assignment process, the dispatcher 22 may implement an additional communications channel between itself and the APs 24 (not shown in the Figures). Such a channel is used by the APs 24 to periodically update the dispatcher 22 with load information and to report when calls have been terminated. This enables the dispatcher 22 to make assignments based on up-to-date loading information, resulting in high overall utilization of the MS 12.

Effectively supporting conferencing services poses special challenges. Conferences are multi-party sessions, whereas other services generally consume a single session. All requests for a specific conference must be sent to the same AP to eliminate the need for multiple AP's to coordinate and share conference data. Although it is possible to obtain load information for a particular conference by parsing the incoming signaling messages, such an approach is expensive in terms of resource utilization. The additional processing load required for this message handling would negatively affect the performance and scalability of the MS 12. To solve this problem, a load hint in the form of a "size" parameter is provided in an easily accessible location in the Request URI (e.g. sip:conf=1234@ms1.network.com; size=64). The size parameter may optionally be set by applications that wish to gain the best utilization of the MS 12. If the size parameter is present, the dispatcher 22 uses it in the process of selecting an AP 24. If the parameter is not present, the dispatcher 22 applies a default load when making the assignment. In either case, if the feedback channel to the dispatcher 22 is present, the APs 24 update the dispatcher 22 with their actual load values.

After the SIP dispatcher 22 selects an AP 24, it changes the port number appearing in the UDP datagram to the port number of the selected AP 24. Thus, if the selected AP 24 has port number 5065 assigned to it, then the destination UDP port number of the resulting request datagram will be 5065. This modified INVITE message is then forwarded to the selected AP 24 via the switch fabric 26. In contrast to a SIP proxy, the dispatcher 22 does not modify message headers such as Via and/or Record Route. Only the port number in the request datagram is changed. The SIP dispatcher 22 does not monitor any subsequent messaging for, nor keep any SIP signaling state pertaining to, this session.

The selected AP 24 then performs the normal processing associated with a SIP INVITE request, which initially includes creating a response message shown as "200 OK" and sending this response message to the requesting AS 10. As shown in FIG. 3, this response message is sent directly to the AS 10 bypassing the SIP dispatcher 22. The 200 OK message includes a Contact field that is used by the responding AP 24 to notify the requesting AS 10 to direct further messages directly to the responding AP 24 rather than to the well-known address and port number. This is accomplished by placing the port number of the responding AP in the Contact field, i.e.:

Contact: <sip:svc@10.1.1.1:5065>

In the example shown in FIG. 3, the AS then performs a similar INVITE/200 OK sequence with the ME 18. The 200 OK messages are acknowledged by sending corresponding ACK messages to the MS 12 and ME 18. The ACK message back to the responding AP 24 uses the address obtained from the Contact field of the 200 OK message from the AP 24. Referring back to FIG. 2, the ingress processing function 20 of the MS 12 receives the ACK message and forwards it to the correct AP 24 via the switch fabric 26 bypassing the SIP dispatcher 22. The forwarding of messages within the MS 12 may be performed using conventional techniques employing circuit or flow identifiers that are assigned to messaging flows by internal switching control logic (not shown). Once the SIP dispatcher 22 has selected an AP 24 for a given Call or Conference ID, this information can be given to the internal switching control logic and to the ingress processor 20 to facilitate the routing of later-received messages directly to the correct AP 24.

Once the assigned AP 24 has received the ACK message, the AS 10 and AP 24 have exchanged sufficient information to create the media channel 14 for the session on behalf of an ME 18, which as shown in FIG. 1 extends directly between the ME 18 and the MS 12. The media flow for the remainder of the session can be conducted in the normal manner between these two elements.

Although the illustrated embodiment employs a switch fabric 26 for routing media streams to/from the APs 24, it may be possible to employ other forms of interconnection in alternative embodiments, including a local-area network (LAN). Also, it may be desirable in alternative embodiments to separate the dispatcher 22 into a separate physical system from the APs 24, i.e., to employ a modified media server similar to that shown in FIG. 2 but having a communications interface to a separate dispatcher system in place of the dispatcher 22.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. A method of processing a plurality of session initiation dialogs, each session initiation dialog including a respective initial message sent by a source of the session initiation dialog, each initial message including a well-known port identifier used to identify the recipient of the message, the method comprising:
   receiving the initial message for each of the session initiation dialogs at a dispatcher;
   at the dispatcher, upon receiving the initial message for each of the session initiation dialogs, (1) selecting one of a plurality of processors to conduct the respective session initiation dialog, and (2) forwarding the initial message to the selected processor; and
   at each of the processors, upon receiving the initial message of one of the session initiation dialogs from the dispatcher, (1) creating a corresponding response message including a port identifier uniquely associated with the processor to identify a port to which subsequent messages of the session initiation dialog are to be directed, and (2) sending the response message to the source of the initial message to enable subsequent messages of the session initiation dialog to be sent directly to the selected processor.

2. A method according to claim 1, further comprising at the dispatcher, modifying each initial message to include the port identifier associated with the processor selected for that message, and wherein forwarding the initial message comprises forwarding the modified initial message.

3. A method according to claim 1, wherein the dispatcher and the processors are co-located in a single physical system, and wherein forwarding the initial message comprises sending the initial message through a switch fabric in the system.

4. A method according to claim 1, wherein the dispatcher and the processors are located in separate physical systems, and wherein forwarding the initial message comprises sending the initial message across a local area network (LAN) interconnecting the separate physical systems.

5. A method according to claim 1, wherein the session initiation dialogs are conducted according the Session Initiation Protocol.

6. A method according to claim 1, wherein the session initiation dialogs are conducted according to the Media Gateway Control Protocol.

7. A method according to claim 1, further comprising, at each of the processors, sending information regarding the loading of the processor to the dispatcher, and wherein the dispatcher is operative when selecting a processor to achieve a desired distribution of loading of the processors based on the loading information from the processors.

8. A method according to claim 1, wherein the dispatcher is operative when selecting a processor for a session initiation dialog to achieve a desired distribution of loading of the processors based on a session size indication contained in the initial message of the session initiation dialog.

9. A media server system for providing media services to at least one application server, the media services employing respective sessions and corresponding session initiation dialogs, each session initiation dialog including a respective initial message sent by a source of the session initiation dialog, the source being one of the application servers, each initial message including a well-known port identifier used to identify the recipient of the message, the system comprising:

a dispatcher; and a plurality of processors, the dispatcher being operative to (1) receive the initial message for each of the session initiation dialogs, and (2) upon receiving the initial message for each of the session initiation dialogs, (i) select one of the processors to conduct the respective session initiation dialog, and (ii) forward the initial message to the selected processor, and each of the processors being operative, upon receiving the initial message of one of the session initiation dialogs from the dispatcher, to (1) create a corresponding response message including a port identifier uniquely associated with the processor to identify a port to which subsequent messages of the session initiation dialog are to be directed, and (2) send the response message to the application server that was the source of the initial message to enable subsequent messages of the session initiation dialog to be sent directly to the selected processor.

10. A media server system according to claim 9, wherein the dispatcher is operative to modify each initial message to include the port identifier associated with the processor selected for that message, and is further operative when forwarding the initial message to forward the modified initial message.

11. A media server system according to claim 9, comprising a single physical system containing the dispatcher, the processors, and a switch fabric interconnecting the dispatcher and the processors, the switch fabric being operative to carry the initial messages from the dispatcher to the processors.

12. A media server system according to claim 9, comprising separate physical systems containing the dispatcher and the processors respectively, the separate physical systems being interconnected by a local area network (LAN) operative to carry the initial messages from the dispatcher to the processors.

13. A media server system according to claim 9, wherein the session initiation dialogs are conducted according the Session Initiation Protocol.

14. A media server system according to claim 9, wherein the session initiation dialogs are conducted according to the Media Gateway Control Protocol.

15. A media server system according to claim 9, wherein each of the processors is further operative to send information regarding the loading of the processor to the dispatcher, and wherein the dispatcher is further operative when selecting a processor to achieve a desired distribution of loading of the processors based on the loading information from the processors.

16. A media server system according to claim 9, wherein each application server is operative when creating an initial message of a session initiation dialog to include an indication of the size of the session, and wherein the dispatcher is operative when selecting a processor for a session initiation dialog to achieve a desired distribution of loading of the processors based on the session size indication contained in the initial message of the session initiation dialog.

* * * * *